Patented Mar. 31, 1925.

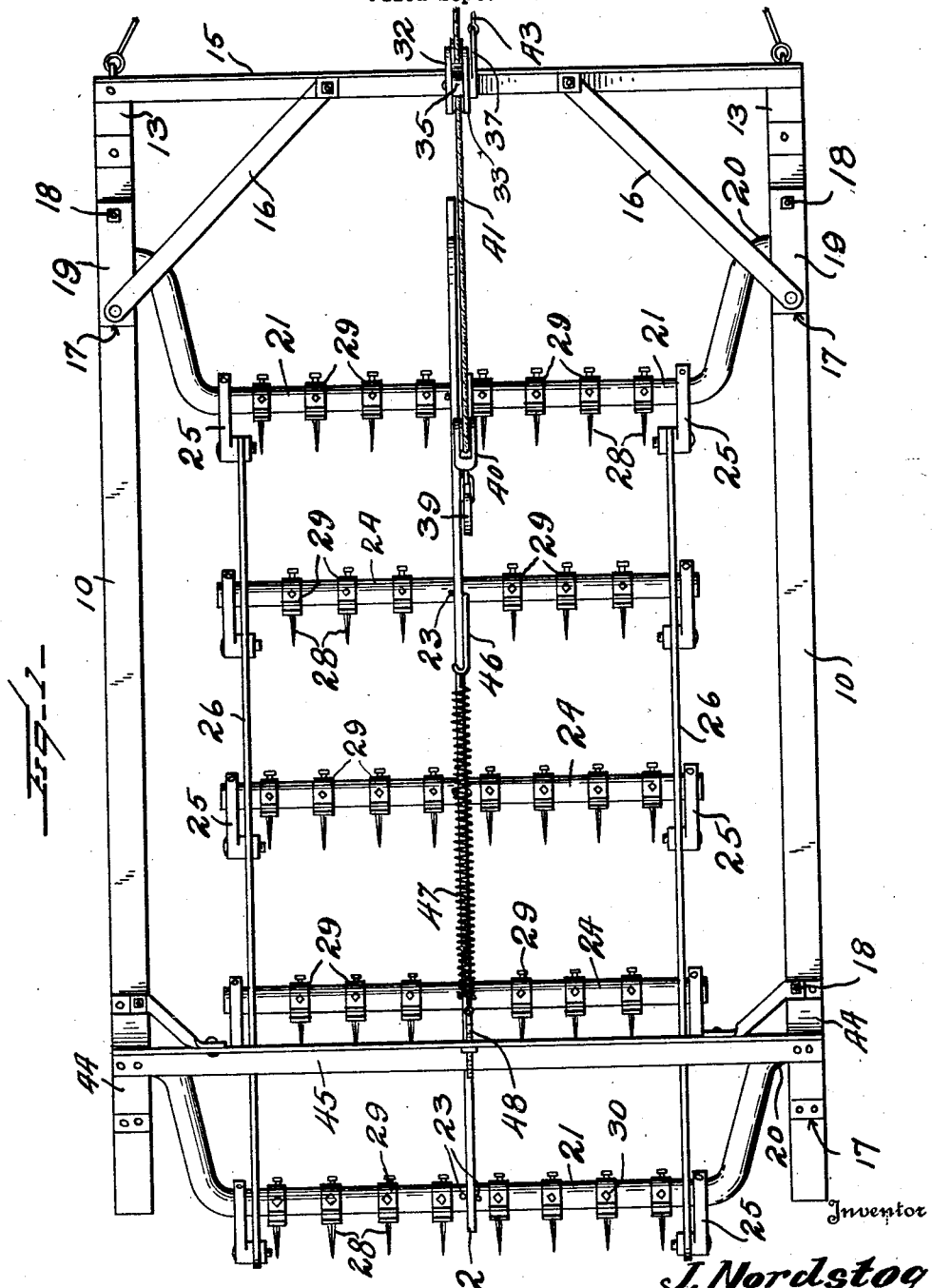

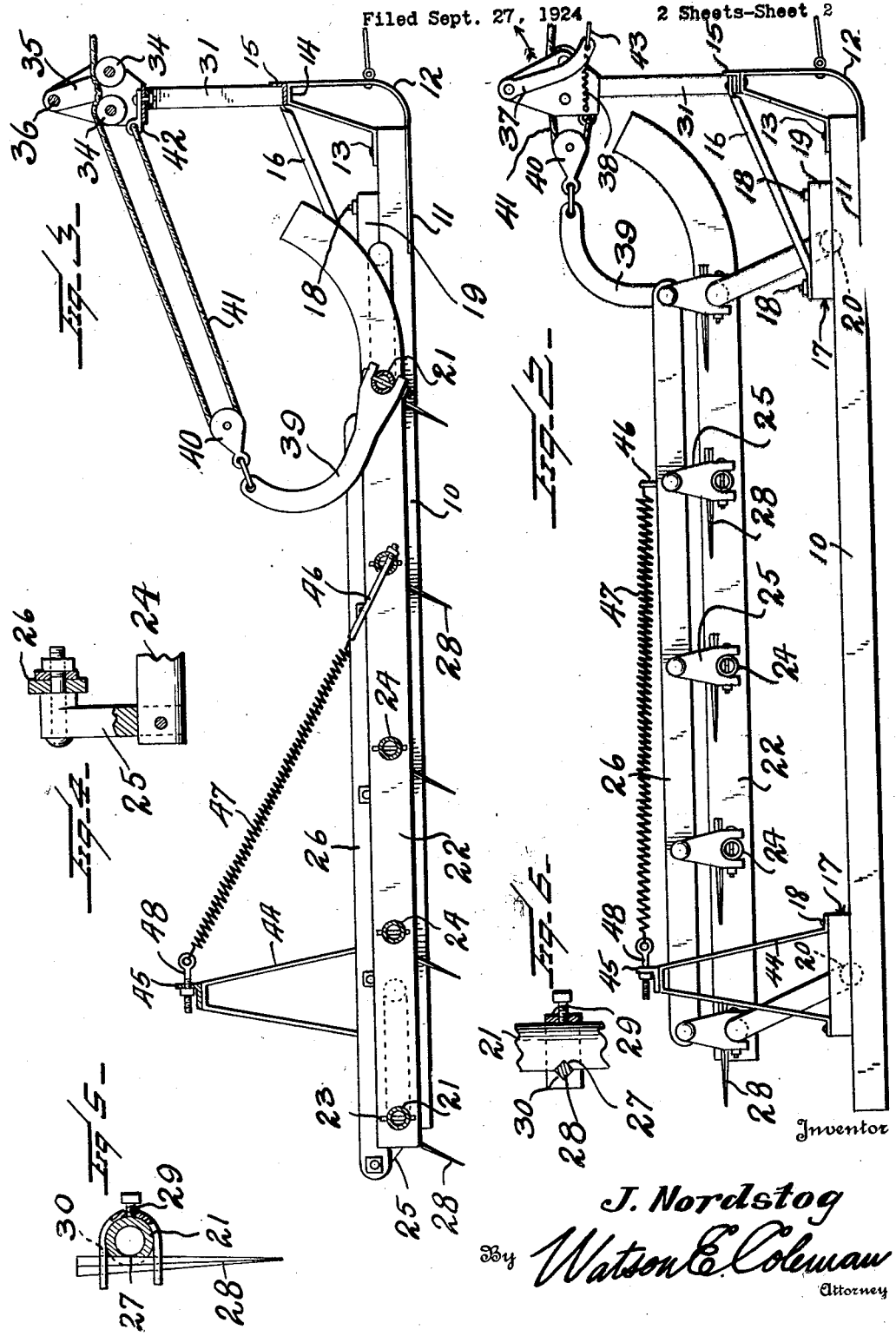

1,531,453

UNITED STATES PATENT OFFICE.

JOHN NORDSTOG, OF CROSBY, NORTH DAKOTA.

CULTIVATOR.

Application filed September 27, 1924. Serial No. 740,274.

*To all whom it may concern:*

Be it known that I, JOHN NORDSTOG, a citizen of the United States, residing at Crosby, in the county of Divide and State of North Dakota, have invented certain new and useful Improvements in Cultivators, of which the following is a specification, reference being had to the accompanying drawings.

This invention relates to cultivators, and more particularly to toothed cultivators of the drag type.

An important object of the invention is to provide a cultivator including ground engaging supports and a toothed gang associated with these ground engaging supports and adjustable upon the ground engaging supports to swing so that the teeth thereof are substantially vertically arranged and project below the lower surface of the ground engaging members, or the teeth thereof are horizontally arranged and arranged above the ground engaging members so that they do not drag upon the ground during transportation of the device from place to place.

A further object of the invention is to provide in a device of this character a novel and improved means for holding the gang in elevated position.

A still further object of the invention is to provide in a device of this character a novel and improved gang construction whereby the teeth of the gang are simultaneously rotated from vertical to horizontal position, or from horizontal to vertical position as the case may be.

These and other objects I attain by the construction shown in the accompanying drawings, wherein for the purpose of illustration is shown a preferred embodiment of my invention and wherein:—

Figure 1 is a plan view of a harrow constructed in accordance with my invention;

Figure 2 is a side elevation thereof;

Figure 3 is a longitudinal sectional view therethrough, the gang of the harrow being shown in operative position;

Figure 4 is an enlarged detail view showing one of the cranks employed for connecting the shafts to the link;

Figure 5 is a detail vertical sectional view showing the manner of securing the teeth to the shafts;

Figure 6 is a transverse sectional view further illustrating the manner of securing the teeth to the shafts.

Referring now more particularly to the drawings, the numeral 10 indicates ground engaging members shown in the form of flat longitudinally extending bars, the forward ends of which are provided with reinforcing toe pieces 11, the forward ends of which are curved upwardly and forwardly, as at 12, and then brought downwardly to rest upon and be secured to the upper surface of the bar 10, as at 13, so that their intermediate portions 14 serve as supports for a transversely extending brace or bar 15. This bar 15 is further braced to the side members 10 by inclined braces 16 engaging the bar 15 at points spaced inwardly from the ends thereof and the ground engaging elements 10 at points spaced longitudinally from the ends thereof.

Each ground engaging bar is formed at points spaced slightly from the ends thereof with the lower halves of bearings 17, the upper halves 19 of which are secured to the bar by bolting, as at 18. In corresponding bearings of the side bars are engaged the ends of shafts 20, the intermediate portions of which are formed to provide cranks 21 of slightly less width than the distance between the bars. These cranks are joined centrally by a bar 22 through which the cranks are rotatably directed, the cranks being each provided with means, as at 23, for preventing displacement of the bar longitudinally of the crank. Arranged between the cranks 21 are a plurality of cross shafts 24, each of which has its central portion rotatably mounted within the bar 22. Each crank 21 and shaft 24 has secured thereto at each end thereof a crank 25, the upper ends of the cranks at each end of the bars being connected by a link 26 so that the cranks move in unison and accordingly the shafts will move in unison with one another and with the cranks 21. Each crank 21 and shaft 24 has formed therein a plurality of notches 27 in which are engaged the upper end of teeth 28 secured to the crank or shaft within the notch by means of adjustable U-straps 29 having openings 30 through which the teeth are directed.

Secured upon the transverse bar 15 and extending upwardly therefrom and centrally thereof is a support 31, upon the upper end of which is mounted a pair of spaced plates 32 and 33 between which are rotatably mounted a pair of grooved pulleys 34. These pulleys are mounted between the plates intermediate the ends of the plates, and at the upper ends of the plates between the plates is mounted a rope dog 35 which is secured to a shaft 36 rotatably directed through the plates 32 and 33, one end of the shaft having secured thereto an arm 37 operating adjacent the outer face of the plate 33 and connected with the plate 33 by a spring 38 shifting the arm in such a direction that the rope dog 35 is thrown toward the peripheries of the pulleys 34. Rigidly secured to the forward crank 21 is an arm 39, the upper end of which has secured thereto a pulley 40 about which passes a cable 41, one end of which is secured to the support 31, as at 42, and the opposite end of which is trained across the pulleys 34 beneath the rope dog 35. This rope will lead forwardly to the tractor or other means for shifting the cultivator over the ground and serves as a means whereby the forward crank 21 and accordingly a remaining crank, as hereinafter more particularly set forth, are caused to swing from a horizontal to a vertical position. The rope dog's engagement with the cable 41 will permit this cable to be drawn in a direction to swing the cranks from horizontal to vertical position but prevents return movement of the cable until the arm 37 is moved in the direction of the arrow on Figure 2, which may be accomplished by means of the operating cable 43 which is led to the same point as the cable 41. Secured to the bars 10 adjacent the rear end thereof, and preferably by the bolts 18 of the rear bearing 17, are a pair of vertical standards 44, the upper ends of which are connected by a transversely extending bar 45.

To one of the shafts 24, and preferably the foremost shaft 24, is secured an upwardly extending arm 46, the upper end of which is secured to one end of a spring 47, the opposite end of which is engaged with a member 48 adjustably directed through the bar 45 so that the tension of the spring may be regulated. This spring constantly urges the upper end of the arm 46 rearwardly and accordingly tends to rotate the shaft to which the arm is attached and, because of the crank and link connections between the shafts and cranks, to rotate all of the shafts and cranks. The rotation of the cranks will cause shifting of the entire assemblage of bars and cranks rearwardly and downwardly, and during this time the rotation of the shafts has moved the teeth 28 thereof, which are in horizontal position when the device is elevated as shown in Figure 2, to a substantially vertical position as shown in Figure 3, in which position they project below the lower surface of the ground engaging bars 10 to perform the cultivation.

Since it is obvious that the structure of the cultivator as hereinbefore set forth is capable of a certain range of change and modification without materially departing from the spirit of my invention, I do not limit myself to such specific structure except as hereinafter claimed.

I claim:—

1. In a cultivator of the type described, a pair of transversely spaced ground engaging bars, spaced connections between the ground engaging bars maintaining the same in parallel relation, a pair of crank shafts having their ends rotatably mounted in bearings carried by said bars, said crank shafts being disposed transversely of the bars and spaced longitudinally thereof and each having a single crank, a bar engaged with the cranks of the shafts, means normally maintaining the shafts with the cranks thereof in horizontal position, means for rotatably shifting the crank shafts against the action of the first named means, means for releasing the last named means, a cultivator gang supported from said crank shafts and said bar including a plurality of shafts, connections between the shafts and cranks of the crank shafts whereby they rotate in unison, and teeth carried by said shafts and cranks and vertically directed when the cranks are horizontally directed.

2. In a cultivator of the type described, a pair of transversely spaced ground engaging bars, spaced connections between the ground engaging bars maintaining the same in parallel relation, a pair of crank shafts having their ends rotatably mounted in bearings carried by said bars, said crank shafts being disposed transversely of the bars and spaced longitudinally thereof and each having a single crank, a bar engaged with the cranks of the shafts, means normally maintaining the shafts with the cranks thereof in horizontal position comprising a spring connected with said cranks at one end and at its opposite end adjustably connected with one of said connections between the ground engaging bars.

3. In a cultivator of the type described, a pair of transversely spaced ground engaging bars, spaced connections between the ground engaging bars maintaining the same in parallel relation, a pair of crank shafts having their ends rotatably mounted in bearings carried by said bars, said crank shafts being disposed transversely of the bars and spaced longitudinally thereof and each having a single crank, a bar engaged with the cranks of the shafts, a spring normally maintaining the shafts and the cranks thereof in horizontal position, an arm secured to the forward crank, means secured to the forward connection between the ground engaging bars for shifting the cranks against the action of the first named means and including a pulley carried by the arm of the forward crank, a cable secured at one end to the forward connection between the ground engaging bars, a pair of pulleys carried by the forward connection between the ground engaging bars and over which said cable passes after being directed through the pulley of the arm of the forward crank, a rope clutch associated with the last named pulleys and normally positioned to engage said cable and prevent rearward movement thereof, means for releasing said rope clutch, and a cultivator gang supported from said crank shafts embodying a plurality of teeth extending below the lower surface of said ground engaging bars when the crank shafts are in horizontal positions.

4. In a cultivator of the type described, a pair of transversely spaced ground engaging bars, spaced connections between the ground engaging bars maintaining the same in parallel relation, a pair of crank shafts having their ends rotatably mounted in bearings carried by said bars, said crank shafts being disposed transversely of the bars and spaced longitudinally thereof and each having a single crank, a bar engaged with the cranks of the shafts, a spring normally maintaining the shafts and the cranks thereof in horizontal position, an arm secured to the forward crank, means secured to the forward connection between the ground engaging bars for shifting the cranks against the action of the first named means and including a pulley carried by the arm of the forward crank, a cable secured at one end to the forward connection between the ground engaging bars, a pair of pulleys carried by the forward connection between the ground engaging bars and over which said cable passes after being directed through the pulley of the arm of the forward crank, a rope clutch associated with the last named pulleys and normally positioned to engage said cable and prevent rearward movement thereof, means for releasing said rope clutch, a cultivator gang supported from said crank shafts embodying a plurality of teeth extending below the lower surface of said ground engaging bars when the crank shafts are in horizontal positions, said cultivator gang comprising a plurality of shafts rotatably directed through the bar connecting said crank shafts, an arm secured to each crank shaft, a link pivoted at its ends to the last named arms of the crank shafts, a connection between each of the shafts of the cultivator gang and said link whereby the shafts are rotated in unison with the cranks, and teeth carried by said shafts and cranks and vertically directed when the cranks are horizontally directed.

In testimony whereof I hereunto affix my signature.

JOHN NORDSTOG.